March 3, 1959　　　　W. L. IRBY　　　　2,876,295
LATERAL MAGNETIC RECORDER
Filed Sept. 14, 1954　　　　　　　　　　6 Sheets-Sheet 1
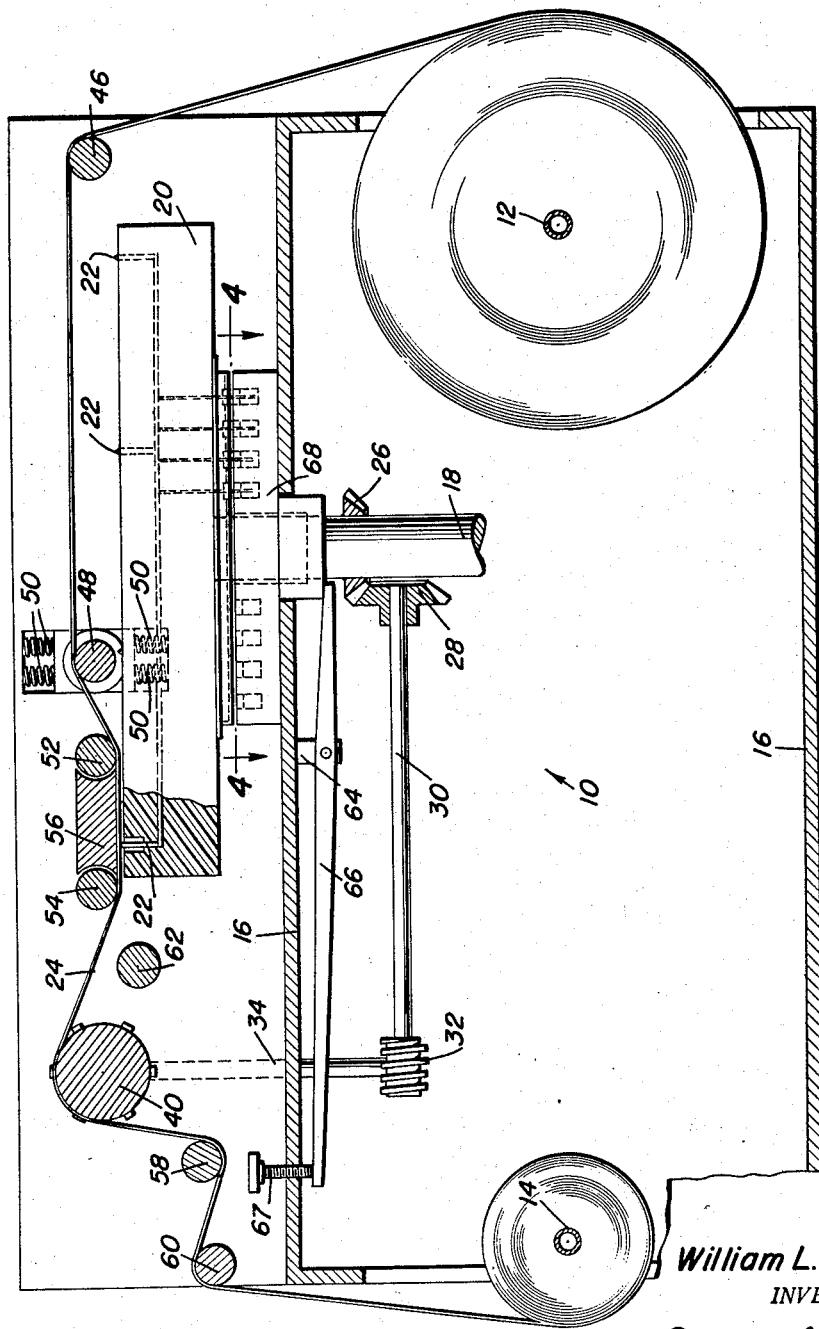
William L. Irby
INVENTOR.

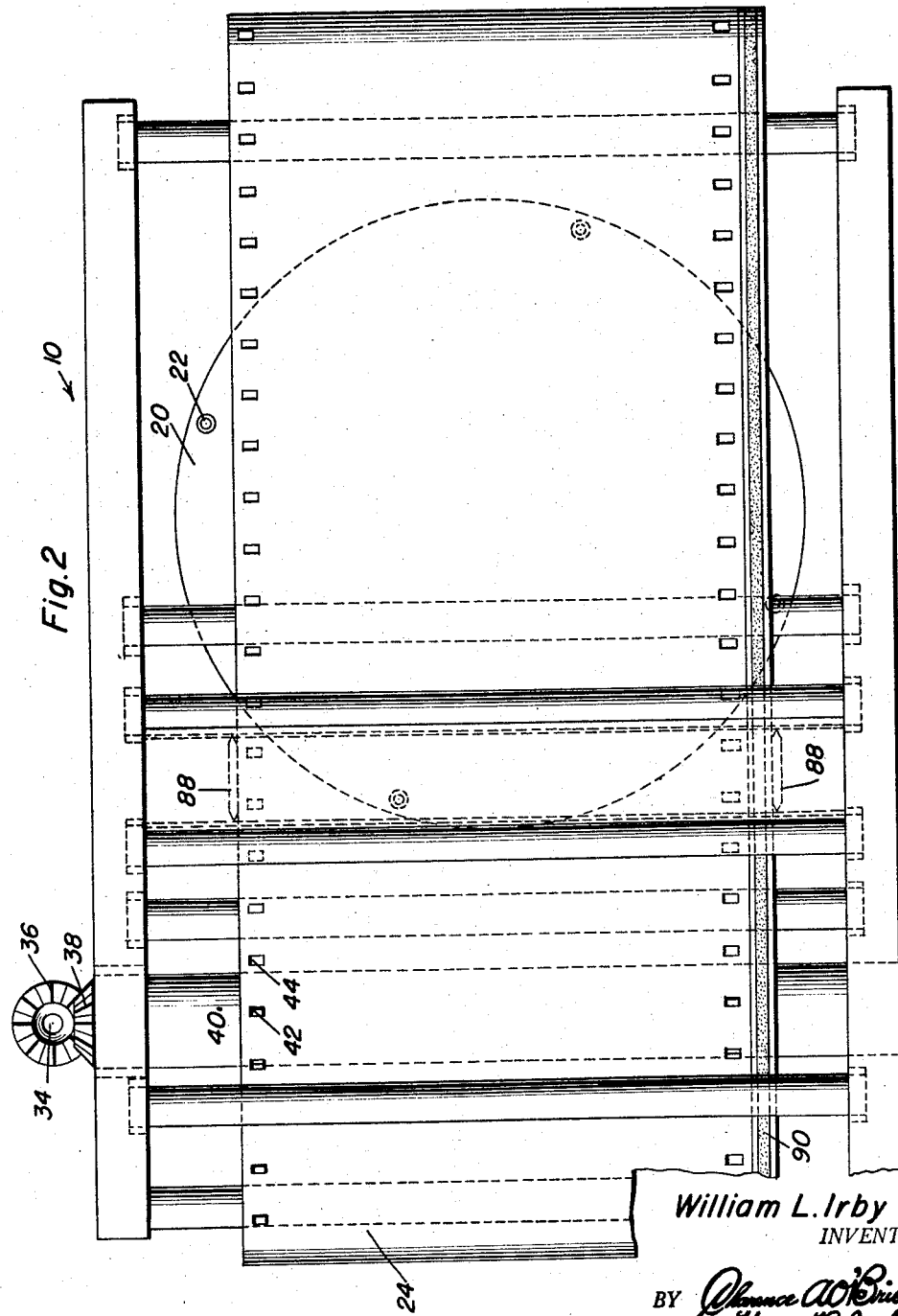

March 3, 1959 W. L. IRBY 2,876,295
LATERAL MAGNETIC RECORDER
Filed Sept. 14, 1954 6 Sheets-Sheet 3

William L. Irby
INVENTOR.

BY
Attorneys

March 3, 1959 W. L. IRBY 2,876,295
LATERAL MAGNETIC RECORDER
Filed Sept. 14, 1954 6 Sheets-Sheet 4
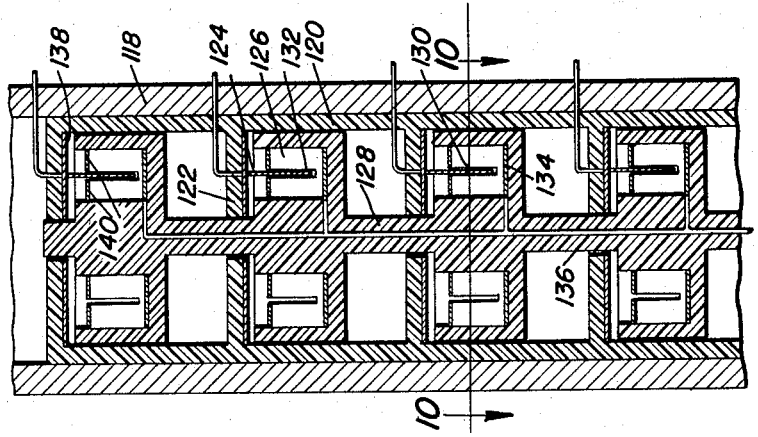
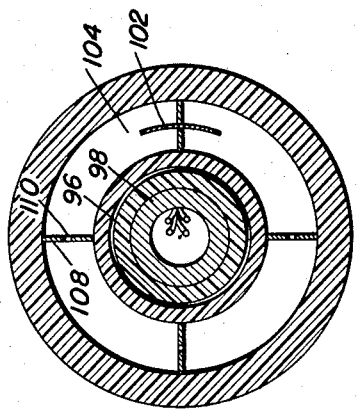
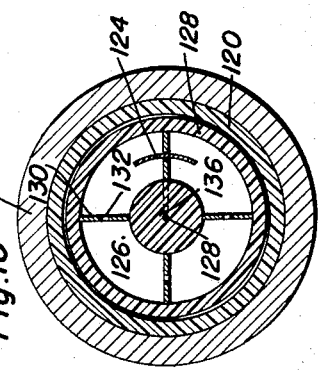
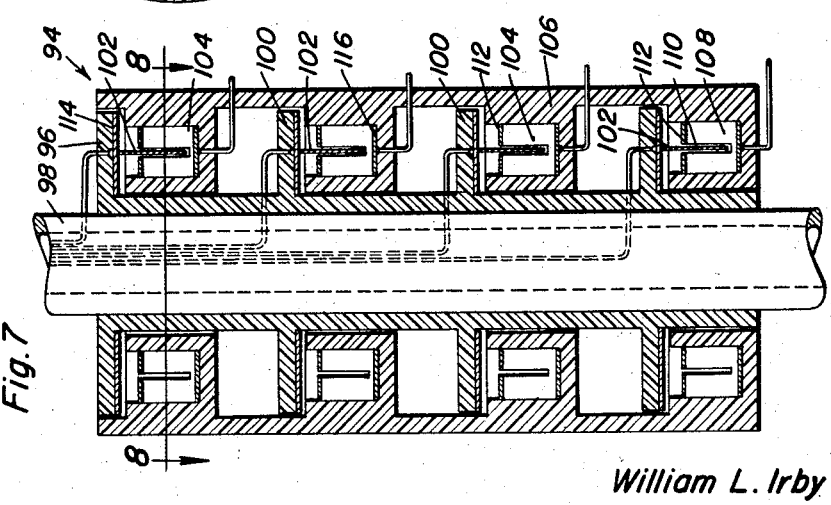
William L. Irby
INVENTOR.

March 3, 1959 W. L. IRBY 2,876,295
LATERAL MAGNETIC RECORDER
Filed Sept. 14, 1954 6 Sheets-Sheet 5

William L. Irby
INVENTOR.

March 3, 1959
W. L. IRBY
2,876,295
LATERAL MAGNETIC RECORDER
Filed Sept. 14, 1954
6 Sheets-Sheet 6
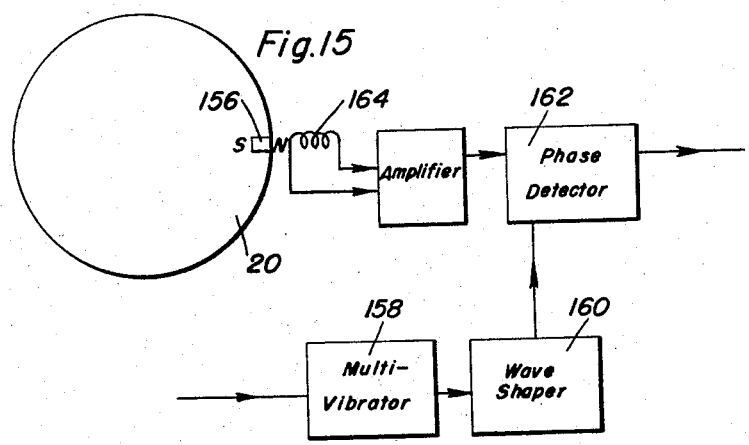
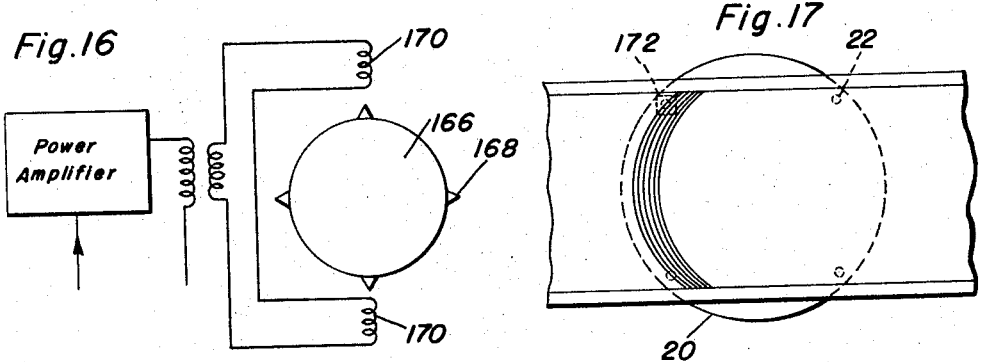
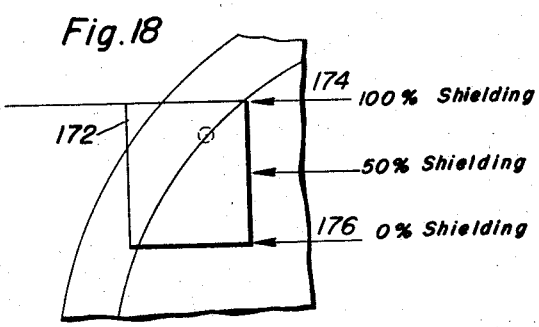
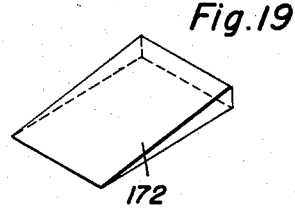
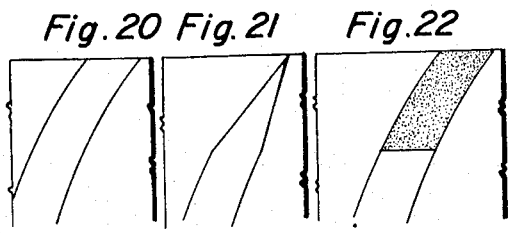
William L. Irby
INVENTOR.
BY Clarence A. O'Brien
and Harvey B. Jacobson
Attorneys

United States Patent Office 2,876,295
Patented Mar. 3, 1959

2,876,295

LATERAL MAGNETIC RECORDER

William L. Irby, Tulsa, Okla.

Application September 14, 1954, Serial No. 456,006

3 Claims. (Cl. 179—100.2)

This invention relates to the art of recording and reproducing and more particularly to improved means for magnetically recording and reproducing high frequency electrical impulses on a magnetic powder-coated tape which is especially adapted for reproduction of video signals in conjunction with lower frequency sound signals.

The present day systems of magnetic recording and reproduction are limited in frequency range and this limitation is dependent on the number of linear units of tape passing the recording and reproducing head or heads of the magnetic recording and reproducing apparatus. These systems which are thus dependent upon the linear speed of the tape, when operating in the higher frequency range use a long thin tape traveling at high speeds. Of course, the amount of time that the tape can be used to record or reproduce is restricted to the supply of tape that can be wound on the take up and supply reels of the apparatus. This upper frequency range is therefore restricted by the practical size limitations of the reels and the resulting practical speed limitations of the tape. The construction of the present invention features means for permitting more linear units of recording and reproducing magnetic tape surface to pass through recording and reproducing head or heads or lower tape speeds thereby increasing the recorded and reproduced frequency range.

A further object of the invention resides in the provision of a novel recording-reproducing system which employs a wider magnetic powder-coated tape which is passed over a rotating wheel in which there are mounted a plurality of recording and reproducing heads. The heads are mounted adjacent the peripheral edge of the rotating wheel and are spaced equally distant from each other so that when the exposed surface of the recording and reproducing head assemblies come in contact with the underside of the magnetic powder-coated tape they will record magnetic arcs or paths lateraally across the tape. The width of the magnetic coating on the tape is slightly larger than the distance between two adjacent recording heads so that an arc or path being recorded by any one head is not completed before the next recording head moves onto the coated area and starts recording a path of its own. The path recorded by each succeeding recording head is slightly behind the path recorded by the preceding head. The spacing of the arc or path is such that at any particular time in recording, the path directly beneath a recording head is the only one being appreciably magnetized by the particular head and in reproduction the path directly beneath a pick up or reproducing head is the only one whose magnetic field is causing an appreciable magnetic fluctuation in that particular head.

A further object of the invention resides in the provision of a novel tape which employs paths or arcs of magnetic powder-coatings on a ribbon which is provided with sprockets therein so that the travel of the tape may be synchronized.

Still another feature of the invention lies in the novel commutators utilized in interconnecting the various magnetic pick up and reproduction heads with a single receiving and transmitting source.

Another very important object of the invention resides in the provision of means which may be optionally provided and used for reducing or eliminating such surges of electrical current created in the winding of a reproduction head when the reproduction head suddenly comes into the magnetic field of a recorded area on a tape. This means may include the synchronizing of the movement of the recording wheel to the vertical synchronization field pulses, or a tapered shield or magnetic fader may be placed between the tape and the recording heads. However, perhaps the most important means for reducing the surges occurring in the reproduction heads may be the provision of specially prepared tapes having strips or paths tapering in width, density or thickness.

Still further objects and features of this invention reside in the provision of a lateral magnetic recorder which is simple in construction, highly efficient in operation, and which is relatively inexpensive to manufacture thereby permitting wide utilization in the television and broadcast industries particularly.

These, together with the various ancillary objects and features of the invention which will become apparent as the following description proceeds, are attained by this lateral magnetic recorder, a preferred embodiment of which has been illustrated in the accompanying drawings, by way of example only, wherein:

Figure 1 is a sectional view illustrating the construction of the various operating elements of the present invention;

Figure 2 is a plan view of the lateral magnetic recorder;

Figure 7 is a sectional view of a modified form of commutator;

Figure 8 is a horizontal sectional view as taken along the plane of line 8—8 in Figure 7;

Figure 9 is a sectional view of a modified form of commutator;

Figure 10 is a sectional view as taken along the plane of line 10—10 in Figure 9;

Figures 11 through 16 are schematic illustrations of various arrangements which can be utilized for reducing surges in a reproduction head by synchronizing the movement of the recording wheel with the vertical synchronization field pulses;

Figures 17 through 19 are illustrations of the construction of a tapered shield which can be utilized;

Figure 20 is a partial plan view of a portion of tape showing the ends of the magnetically coated path or strip which may be tapered in thickness;

Figure 21 is a partial plan view of a portion of tape showing the ends of the magnetically coated strip which is tapered in width; and, Figure 22 is a view similar to Figures 20 and 21 showing the ends of the magnetically coated strip which is tapered in density.

Figure 4:
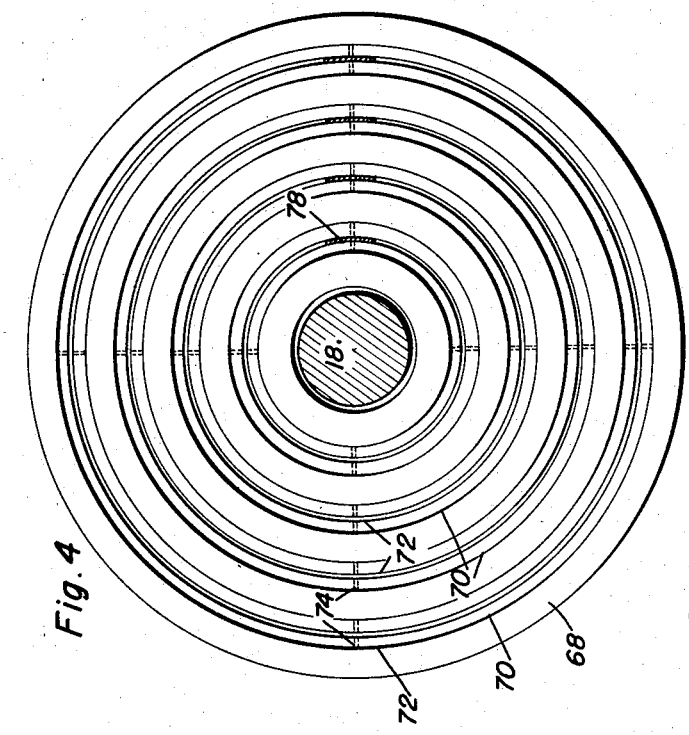
Figure 4 is a horizontal sectional view as taken along the plane of lines 4—4 in Figure 1 and illustrating the construction of a flat commutator used in the invention.

With continuing reference to the accompanying drawings wherein like reference numerals designate similar parts throughout the various views, and with particular attention initially to Figures 1 and 2, it will be noted that herein there is disclosed the lateral magnetic recorder generally designated by reference numeral 10 which comprises the present invention. This lateral magnetic recorder includes a supply reel 12 and a take-up reel 14 which is mounted in any suitable base or cabinet 16. Drive means, not shown, may be provided for separately actuating the supply wheel 12 and take-up reel 14 as may be desired.

A drive shaft 18 followed by any suitable means carries a rotating wheel 20 in which a plurality of recording or reproducing heads 22 are positioned adjacent the peripheral edge of the wheel 20 and equally spaced from each other. The magnetic recording and reproducing heads 22 are spaced from each other a distance somewhat less than the thickness of the tape 24 which is passed thereover and whose construction will be more specifically defined hereinafter.

Mounted on the shaft 18 is a bevel gear 26 which engages a bevel gear 28 mounted on a shaft 30 which carries a worm gear 32 which in turn engages another gear, not shown, which drives a shaft 34 on which a bevel gear 36, see Figure 2, is secured. The bevel gear 36 drives another bevel gear 38 which is connected to a sprocket wheel 40 carrying lugs 42 adapted to engage within the slots 44 formed in the tape 24 so that the movement of the tape 24 can be controlled by motion of the sprocket wheel 40 in synchronization with the rotation of the drive shaft 18, the speed of the sprocket wheel being, of course, dependent upon the gear ratios or the various gears in the drive train.

With the tape 24 being controlled by motion of the sprocket wheel 40 during reproducing or recording the tape is passed over a roller 46 and then over a shock roller 48 which is resiliently mounted by means of springs 50 in any suitable manner. The tape then is passed beneath the rollers 52 and 54 of a back plate 56 and then underneath a roller 58 and above a roller 60 to the take-up wheel 14. When it is desired to rewind the tape or for any other suitable use, the tape may be disconnected from the sprocket wheel 40 and passed above the roller 62 and the take-up reel 14 or the supply reel 12 may be separately excited by the means, not shown, which are provided for rotation of the reels in any conventional manner.

Figure 5:
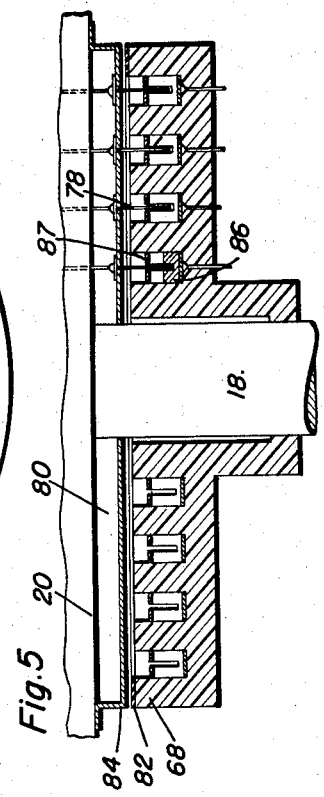
Figure 5 is a vertical sectional view illustrating in detail the construction of the commutator.
Figure 6:
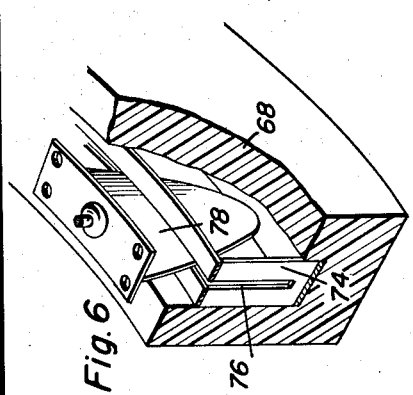
Figure 6 is a partial prospective view illustrating in detail the construction of the blades which extend into the wells of the commutator and illustrating the dividers for preventing movement of the conductor fluid.

Pivotally mounted on a bracket 64 suspended on the base 16 is a lever 66 which is controlled by a set screw 67 so as to adjust and engage a commutator stator base 68 vertically movable but non-rotatable with respect to the drive shaft 18 about which it is concentrically positioned. As can be best seen in Figures 4 through 6, the commutator stator 68 is formed from a suitable insulative material which is easily molded such as any of the various readily available plastics and is provided with a plurality of concentrically disposed troughs 70 therein forming wells. Positioned in each of the wells are rings of electrically conductive material 72 which are then interconnected in any suitable manner to a conventional transmitting-receiving signal source.

A plurality of baffles 74 are provided in the wells 70 and each of the baffles 74 is provided with slots 76 therethrough so that blades 78 which are connected to the various heads 22 pass therethrough. The wells are filled partially with mercury or other electrically conductive fluid as may be desired when the blades 78 ride in the mercury. The blades 78 are adapted to pass through the slots 76. The blades which are carried by the commutator rotor 80 mounted on the rotating wheel 20 receive and transmit the signal from the recording heads 22 to the rings 72 and hence to the transmitting-receiving signal source. Secured to the stator 68 may be a resilient shield 82 and likewise a resilient material 84 may be provided for the rotor 80. The lever 66 will thus raise the stator 68 so that the seals 82 and 84 cooperate to prevent splashing and loss of the mercury or other conductive fluid which is indicated at 86. Hence the successive travel of the heads 22 across the tape will assure a proper recording or reproduction. Split lids 87 are carried by baffles 74 and reduce splashing.

The tape 24 is driven beneath the back plate 56 between the guides 88 provided therefor, see Figure 2, and the rotation of the rotating wheel 20 will cause the heads 22 to successively pick up or reproduce a signal thereon.

Figure 3:
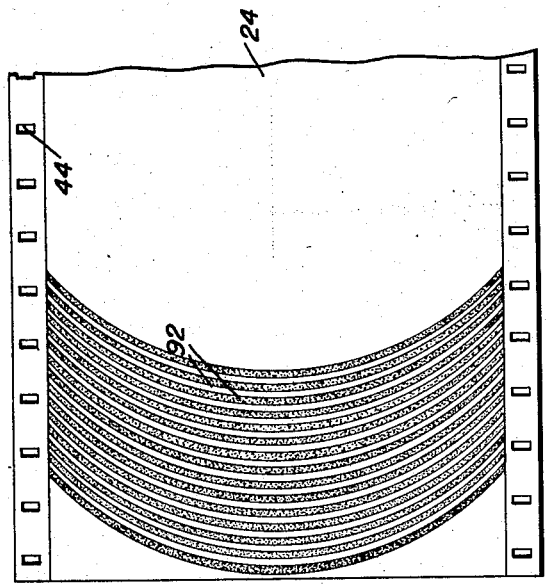
Figure 3 is a partial plan view of a section of the tape utilized with the lateral magnetic recorder.

The tape 24 whose construction can be best seen in Figure 3 may be provided, if desired, as is shown in Figure 2 with a path 90 spaced outwardly from the sprocket holes 44 on one side thereof for recording a relatively low frequency signal such as the sound signal of a combined video-sound broadcast. Obviously, the magnetic powder-coated path 90 may be positioned inwardly of the sprocket holes 44 if desired. Further, as is best seen in Figure 3, if desired the entire under surface of the tape 24 need not be completely coated, but magnetic powder-coated paths, strips, or arcs 92 may be spaced from each other so that there is eliminated any transferred magnetism by contact between adjacent arcs, thereby assuring greater fidelity of reproduction.

Referring now to the modified form of commutators which are shown in Figures 7 through 10 and with particular reference to the form of the invention shown in Figures 7 and 8 it will be seen that herein the commutator generally designated by reference numeral 94 consists of a rotor 96 which is mounted on the drive shaft 98 corresponding to the drive shaft 18. The rotor 96 includes a plurality of vertically spaced rings 100 which support the blades 102. The blades 102 extend into the wells 104 of the stator 106, the wells 104 being vertically stacked with respect to each other and having baffles 108 which divide the wells into sectors. The baffles 108 have slots 110 therein through which the blades 102 can extend and are further provided with split lids 112 for reducing splashing of the mercury or other conductive fluid positioned therein. The resilient material 114 may underlie each of the rings 100 for forming a seal while a conductive ring 116 is positioned in the bottom of each of the wells 104, the rings being interconnected with the transmitting-receiving signal source.

Referring now to Figures 9 and 10 it will be seen that herein there is disclosed a modified form of commutator in which the drive shaft 118 which corresponds with the drive shaft 18 is hollow and has the rotor 120 mounted therein and provided with a plurality of rings 122 integrally formed therewith which carry the blades 124 which are adapted to extend into the wells 126 of the inwardly mounted stator 128. In this form of the invention the wells are provided with baffles 130 having slots 132 therein through which the blades 124 can extend and a conductive ring 134 is mounted in the wells 126 and interconnected to a centrally disposed conductor 136 which is connected to the transmitting-receiving signal source. Seal 138 as well as the split lids 140 are provided for each of the wells 126 for reducing the splashing of mercury or other conductive fluid.

The use of the electrically conductive fluid commutators reduce sparking as in mechanical commutators and interference which would otherwise decrease the fidelity of the recording or reproducing of this lateral magnetic recorder.

In the application of the lateral magnetic recorder to record and reproduce standard video signals there arises a problem. It is that under certain conditions when a playback or reproducing head suddenly comes into the magnetic field of a recorded area there is created in the winding of the reproduction head a surge of electrical current. In the application of the lateral magnetic recorder to reproduce a video signal, this surge would create a noise pulse in this signal every time one of the pick up heads started reproducing a recorded path. This surge is particularly discernible when high frequency alternating current biasing is used or when a previous high frequency A. C. erasing signal was used. This recorded high frequency A. C. biasing or erasing signal is the principal cause of this surge.

Figure 11:
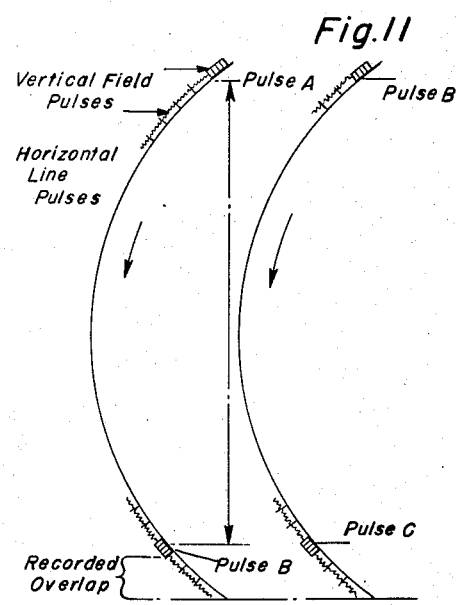
Figure 12:
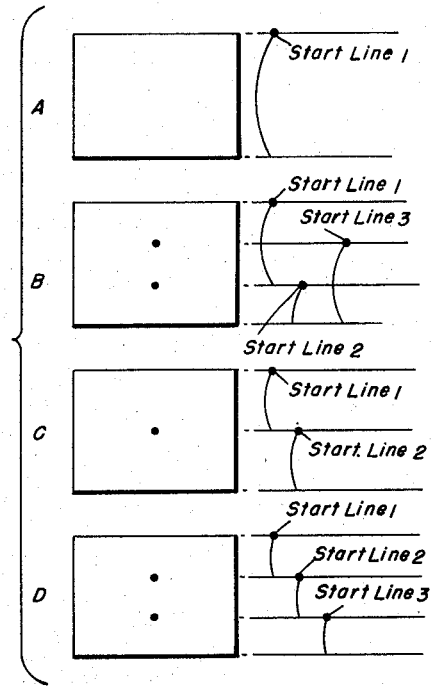

If no precautions were taken, this surge would create a spot on the reproduced picture every time one of the reproducing heads entered a recorded path. If the number of recorded paths per second approximately equaled the number of 262½ line fields per second, then there would occur about 60 spots per second scattered throughout the reproduced picture. If the number of recorded paths per second were exactly the same as the number of fields per second, then these noise spots would all occur superimposed in the same position on the reproduced picture and would appear as one. If the number of recorded paths per second were exactly the same as the number of fields per second and each path recorded one complete field of video information plus the vertical synchronization pulses that preceded this field of video information (as in Figure 11), then this noise pulse would occur while the vertical pulses were occurring. Of course, if the noise pulse occurred while the vertical pulses were occurring then no noise spots would appear in the reproduced picture. The whole idea of these provisions is to record a video signal that could be reproduced with either no noise spots or with a minimum number of superimposed stationary noise spots. Minimization or superimposition of the noise spots could come through synchronization of the rotary motion of the recrding wheel (the speed of the entire mechanism) to the occurring vertical synchronization field pulses. Minimization of the effects of these surges through shielding and the use of a special tape will also be discussed later. With proper synchronization the recorder can record all vertical synchronization field pulses, for example, at the beginning of every line Figure 12 (A); Figure 12 (B) every line and one-half; Figure 12 (C) beginning of every two lines; Figure 12 (D) every third line, etc. This would produce a recording from which a picture could be reproduced that would have (A) no noise spots, (B) two stationary noise spots, (C) one stationary noise spot, (D) two stationary noise spots (sse Figure 12).

Figure 13:
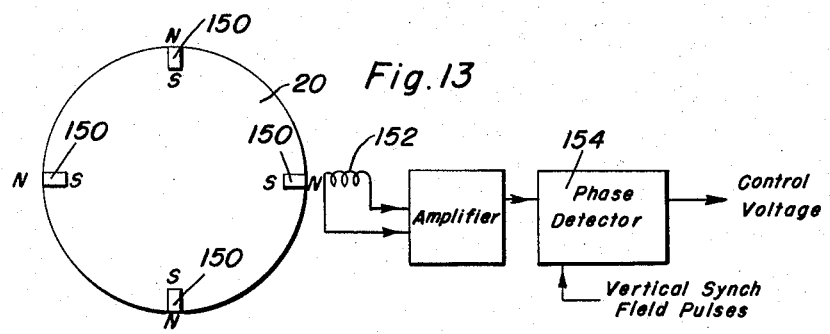

In Figure 13 a number of small permanent magnets 150 are placed equal distances about the outer edge of the recording wheel 20 with one of the poles facing outward. The number of magnets used is equal to the number of recording heads divided by the number of paths required to record one field of video information, or, in other words the number of magnets is equal to the number of fields occurring during one complete rotation of the recording wheel. An inductance 152 is placed in a stationary position close to the outer rim of the recording wheel so that when this pick up coil or inductance 152 and one of the magnets 150 are on the same axis or when one of the magnets 150 passes by the pickup head, the magnetic field from the magnet 150 creates an induced voltage in the coil 152 for every recorded field synchronization pulse. The pulse from the pick up coil is amplified if necessary and fed into a phase sensitive detector 154. The vertical synchronization field pulses, obtained from the composite video signal being recorded or directly from the synchronization generator, are also fed into this phase detector 154. If the vertical field pulses and the pulses induced in the pick up coil 152 occur at any other than the same time there is produced in the phase detector a correcting voltage which when properly amplified, if necessary, is fed into a conventional electronic motor speed control circuit.

Figure 14:
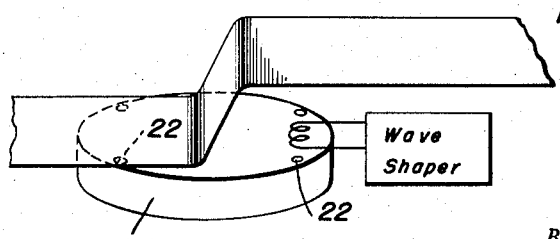

Figure 14 shows an alternate way of creating the synchronization impulses in the pick up coil 152. This pick up coil is positioned over the recording wheel 20 close to the outer edge in such a position that when one of the recording heads 22 just starts to record a path the high frequency biasing current in a recording head starts to induce voltage in the pick up coil 152. These high frequency bias impulses induced in the pick up coil are amplified and run through the necessary wave shaping circuits and the resulting pulse is fed into the phase detector 154.

Figure 15 shows another alternate way of obtaining these two synchronization signals. Only one permanent magnet 156 is mounted in the recording wheel 20. The vertical field pulses are fed into a multivibrator 158 which operates at a frequency that is equal to the number of vertical field pulses per second, 60, multiplied by the number of paths required to record one field of video information, divided by the number of recording heads 22 used. The signal from the multivibrator 158 is then fed into a wave shaping circuit 160 and the resulting pulses are then fed into the phase sensitive detector 162.

The motor, driving the recording wheel 20, should be one whose speed is easily controlled by varying the field current such as a servomotor. The control voltage, from the phase sensitive detector, would be used to control the plate conduction time of power amplifiers, such as thyratrons, used as conventional current control devices for the field current of a servomotor. The varying of this control voltage, resulting in either amplitude or phase change, when used with conventional servomechanism amplifier circuits causes the control grids of these power amplifiers to control the firing time of these tubes thus regulating the field current. An alternate way of interpreting the use of these signals in conjunction with a conventional power servomechanism is that the amplified signal from the pick up coil 164 is substituted for the actuating signal voltage from the synchro control transformer and the amplified vertical pulses are substituted for the rate generator.

The motor used could also be an A. C. motor whose field current was controlled by triggered thyratrons whose firing time is controlled by the resulting control voltage from the phase detector 162.

These control circuits not only control the speed of the recording wheel but with the proper angular positioning of the pick up coil 164 about the recording wheel 20 the vertical synchronization field pulses can be recorded at any predetermined positions on the paths of the recording tape. A recording made with these synchronization circuits could be reproduced on a lateral magnetic recorder-reproduction machine without these circuits for it is only during recording that this synchronization is necessary.

Possibly the simplest and one of the most accurately controlled motors that could be used to drive the recording mechanism is the synchronous motor. If the vertical synchronization field pulses being recorded are derived from the same 60 cycle A. C. power source that is supplying the power for the synchronous motor, then all that would be necessary for synchronization of the mechanism with the vertical field pulses is a mechanical adjustment of the synchronous motor. However, if the vertical field pulses and the power to run the synchronous motor are not obtained from the same power source, electronic synchronization is necessary, see Figure 16. An impulse wheel 166 attached to the drive shaft going to the recording wheel and electromagnetically synchronized to the vertical field pulses could be used. This arrangement consists of a rotor containing a number of teeth 168 place in the magnetic field of an electromagnet 170 which is energized by an A. C. or pulsating D. C. source whose frequency is the same as and is synchronized by the vertical synchronization field pulses. If the speed of the recording wheel is too slow the pulsating pull of the magnets will pull the recording wheel into synchronization by the action of the magnetic poles on the teeth of the toothed wheel. If the speed of the recording wheel is too fast, the pull of the magnets will act as a brake to slow up the toothed wheel to synchronous speed. The number of teeth required in the toothed wheel is equal to the number of vertical pulses occurring during one revolution of the toothed wheel. The revolutions per second of the recording wheel and the drive shaft is a function of the number of teeth 168. Other methods may use conventional power amplifier circuits.

An economical and practical way of reducing the effects of the surges occurring in the reproduction heads is the use of a special fading device to be used mainly during reproduction. With this special fading device a recording is made with no consideration as to where the vertical synchronization pulses might be recorded on the paths of the tape. In Figure 17 the surges can be reduced by the use of a tapered shield 172 which is placed between the recording wheel 20 and the tape in such a position that each reproduction head 22 must pass over this shield before entering a recorded path. In Figure 18 the shield is shorter than the overlap area in the recorded tape. It has the following special magnetic shielding characteristics. That part 174 of the shield 172 over which the reproducing heads first enter is, as nearly as possible, a complete magnetic shield to any magnetic field from the recorded path directly beneath the reproducing head. That part of the shield over which the reproducing heads last pass 176 is, as nearly as possible, free from magnetic shielding, allowing any magnetic field from the recorded path directly beneath the reproducing head to pass through this shield with as little loss as possible. In other words, the ideal shielding effect of this shield would be 100% shielding on the leading edge to no shielding on the trailing edge with 50% shielding in the center, etc. The desired results that this shield or magnetic fader achieve are to permit the magnetic fields from the recorded tape to gradually build up in the reproduction heads. This magnetic shield could also be used during recording to further reduce the surge effect. This shielding should be as thin as possible physically and should be easily replaced in the mechanism. The shielding material used in the tapered shield could vary in thickness, see Figure 19; or the shield could be a non-shielding material that contains small particles, possessing shielding qualities, that would be bunched up on one end of the shield (not shown).

Probably the most economical and practical way of reducing the surge occurring in the reproduction heads is with a special tape. In Figure 20 there is shown a tape having a tapered arc tapering in thickness while in Figure 21 the beginning of each magnetic powder-coated path or arc is tapered in width. In Figure 22 the arc is tapered in density of the magnetic powder contained in the tapered area. With this tapering of the magnetic powder medium, the recorded magnetic field is gradually built up in the reproduction heads, thus greatly reducing any surges in the reproduction heads. The length of taper must be less than the recorded overlap area.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A lateral magnetic recorder comprising a recording wheel, a plurality of spaced recording-reproducing heads mounted on said recording wheel adjacent the periphery thereof, means for rotating said recording wheel, and means for passing a tape over said recording wheel, said first recited means including a drive shaft, and commutator means supported about said drive shaft, a signal source, said commutator means connecting said heads and said source, said commutator means comprising a plurality of spaced wells having conductive rings therein connected to said signal source, an electrically conductive fluid in said wells fully covering said rings, and blades in the form of circle segments connected to said heads seated in said fluid in said wells.

2. A lateral magnetic recorder comprising a recording wheel, a plurality of spaced recording-reproducing heads mounted on said recording wheel adjacent the periphery thereof, means for rotating said recording wheel, and means for passing a tape over said recording wheel, said first recited means including a drive shaft, and commutator means supported about said drive shaft, a signal source, said commutator means connecting said heads and said source, said commutator means comprising a plurality of spaced wells having conductive rings therein connected to said signal source, an electrically conductive fluid in said wells fully covering said rings and blades in the form of circle segments connected to said heads seated in said fluid in said wells, said wells being vertically spaced with respect to each other.

3. A lateral magnetic recorder comprising a plurality of recording heads, means for passing a tape over said recording heads, commutator means for providing electrical energy to said recording heads, said commutator means including a plurality of spaced wells having a conductive fluid fully covering the floors thereof, a plurality of blades in the form of circle segments connected to said recording heads movable through said fluid in said wells, and signal sources, said signal sources being selectively electrically connected to said conductive fluid in said wells.

References Cited in the file of this patent
UNITED STATES PATENTS

| Number | Name | Date |
| --- | --- | --- |
| 1,564,840 | Faber | Dec. 8, 1925 |
| 2,245,286 | Marzocchi | June 10, 1941 |
| 2,494,244 | Jonard et al. | Jan. 10, 1950 |
| 2,550,803 | Goddard | May 1, 1951 |
| 2,750,449 | Thomson et al. | June 12, 1956 |
| 2,772,328 | Lyon | Nov. 27, 1956 |
| 2,785,326 | Harding | Mar. 12, 1957 |